United States Patent Office 3,192,171
Patented June 29, 1965

3,192,171
PROCESS FOR THE PREPARATION OF EPOXIDE MODIFIED ADHESIVE COMPOSITIONS
Alan L. Lambuth, Bellevue, Wash., assignor to Monsanto Company, a corporation of Delaware
No Drawing. Filed June 13, 1960, Ser. No. 35,395
10 Claims. (Cl. 260—7)

This invention relates to aqueous alkaline adhesive compositions. More particularly, it relates to a novel method for preparing epoxide-modified aqueous alkaline phenolic, protein or mixed phenolic and protein adhesive compositions.

Aliphatic epoxides have been used as cross-linking agents in both phenolic and protein adhesive systems. In aqueous alkaline phenolic adhesive systems they provide increased reactivity at either moderate or high curing temperatures. In aqueous alkaline protein adhesive systems they impart improved resistance to hot and cold water. In combined phenolic and protein adhesive systems, they impart both water and mold resistance, even when cured at room temperature.

Despite these advantages epoxide-modified aqueous alkaline phenolic and/or protein adhesive compositions have not found widespread commercial application. Heretofore, these compositions have been prepared by admixing aliphatic epoxide resins into the desired aqueous alkaline phenolic and/or protein adhesive composition. However, these aliphatic epoxide resins are relatively expensive and price the epoxide-modified adhesives out of the market.

It is an object of this invention to provide epoxide-modified aqueous alkaline phenolic and/or protein adhesive compositions at prices commercially competitive to conventional aqueous alkaline phenolic and/or protein adhesive compositions.

Another object is the provision of a novel process for the preparation of epoxide-modified aqueous alkaline phenolic and/or protein adhesive compositions.

These and other objects are attained by charging an aliphatic halohydrin ether to an aqueous alkaline phenolic, protein, or mixed phenolic and protein adhesive composition and thereafter dehydrohalogenating the aliphatic halohydrin ether to form the corresponding epoxide in situ in the aqueous alkaline adhesive system.

The following examples are given in illustration of the invention and are not intended as limitations thereon. Where parts are mentioned, they are parts by weight.

EXAMPLE I

Preparation of an aliphatic halohydrin ether: Three hundred and seventy parts (about 6 mols) of anhydrous ethylene glycol and 1100 parts (about 12 mols) of anhydrous epichlorohydrin are charged to a reaction vessel equipped with a reflux condenser and a stirrer. The mixture is heated to about 65° C. and is maintained substantially thereat while 1 part of a boron trifluoride-ethyl ether complex containing about 48% $BF_3$ by weight is added dropwise at a uniform rate over a period of 90 minutes, and thereafter until no further evidence of exothermy is observed. The ethylene glycol-epichlorohydrin reaction product is then cooled to about room temperature.

The following three examples illustrate the advantages of this invention when applied to aqueous alkaline protein adhesive systems.

EXAMPLE II

Preparation of an epoxide-modified aqueous alkaline soybean adhesive composition:

| Ingredients: | Parts |
|---|---|
| Soybean flour containing 1% NaF and 3% petroleum base defoamer solution by weight | 100 |
| First water | 200 |
| Second water | 200 |
| 37% Formalin | 0.5 |
| 35% aqueous lime solution | 30 |
| 50% aqueous NaOH solution | 15 |
| "N" brand sodium silicate | 25 |
| Ethylene glycol-epichlorohydrin product of Example I | 8 |
| | 578.5 |

The dry glue base and first water are mixed at about 55° F. for 5 minutes; after which the second water, the formalin, the lime solution, the NaOH solution, the sodium silicate and the ethylene glycol-epichlorohydrin reaction product are successively charged, in that order, allowing a short (ca. 1 minute) mix between each addition. The final mixture is stirred for about 10 minutes. The adhesive composition obtained has a pH of about 13.5 and a normal working 70° F. viscosity of about 1,300 MacMichael #26d units.

EXAMPLE III

Preparation of a conventional aqueous alkaline soybean adhesive composition which is substantially the same as the composition of Example II except in that the ethylene glycol-epichlorohydrin reaction product and formalin are omitted and the water is adjusted to provide a workable viscosity:

| Ingredients: | Parts |
|---|---|
| Soybean flour containing 1% NaF and 3% petroleum base defoamer solution | 100 |
| First water | 200 |
| Second water | 145 |
| 35% aqueous lime solution | 30 |
| 50% aqueous caustic solution | 15 |
| "N" brand sodium silicate | 25 |
| | 515 |

The ingredients are mixed as in Example II. The adhesive composition obtained has a pH of about 13.5 and a normal working 70° F. viscosity of about 1,150 MacMichael #26d units.

EXAMPLE IV

Comparative evaluation of the conventional versus the epoxide-modified aqueous alkaline soybean adhesive compositions of Examples II and III: Five-ply ¾" Douglas fir plywood panels are prepared using 150 pounds of adhesive per thousand square feet of double glue line (MDGL) at assembly times of 5, 15, and 25 minutes respectively, cold pressing the panels at 175 p.s.i. and 75° F. for 15 minutes and then aging the panels at room temperature for 5 days. To maximize the severity of the test, Douglas fir veneers having moderate and severe infection of white pocket rot are employed; the veneers being very carefully matched for uniformity of rot. Individual panels are prepared using each of the soybean adhesives at each of the three assembly times indicated above using the moderately and severely infected fir in separate series; a total of 12 panels being prepared. Each panel was then tested (1) for dry shear strength, measuring both the breaking load and the percent wood failure, and (2) for delamination on alternate cold soak and air drying, the results being expressed as number of soak-dry cycles until failure. The results are presented in Tables A and B, respectively.

The dry shear strength is evaluated by cutting a 3⅛″ x 10″ section from each panel; each section being cut so that the grain of the face plies is oriented parallel to the long axis. Each section is then grooved along a line one inch from the long axis, and parallel thereto, to a depth extending ⅔ through the center ply. A second and similar groove is cut upon the opposite face of each section such that the distance between the grooves is exactly 1 inch. After grooving, each section is cut across the long axis to yield a number of specimens measuring 1″ x 3⅛″ and having a shear area of one square inch located in the center. Six of the specimens cut from each section are broken on the Hydraulic Plywood Testing Machine #HC-455, manufactured by I. F. Laucks, Inc., and the average breaking load and percent wood failure for each set of 6 specimens is determined. A wood failure of 0% indicates that failure occurs entirely within the glue line. Conversely, a wood failure of 100% indicates that the glue line is unformly stronger than the wood within the shear area of the center ply. Obviously, a good plywood adhesive should show a high wood failure.

conclusively, the superior adhesion of the epoxide-modified aqueous alkaline protein adhesive compositions which form one embodiment of this invention.

The next two examples illustrate the advantages, with respect to reactivity, of this invention when applied to aqueous alkaline phenolic adhesive systems.

EXAMPLE V

Preparation of a conventional aqueous alkaline phenolic adhesive composition:

| Ingredients | Parts | Approx. molar proportion |
|---|---|---|
| Phenol | 100 | 1.0 |
| 37% Formalin | 170 | 2.0 |
| Water | 100 | 5.2 |
| First 50% aqueous NaOH solution | 12 | 0.15 |
| Second 50% aqueous NaOH solution | 24 | 0.3 |
| Third 50% aqueous NaOH solution | 24 | 0.3 |
|  | 430 |  |

The phenol, Formalin, water and first alkali are combined and then heated to reflux over a period of 5 to 10 minutes. Cooking is continued at reflux for about 35 to 40 minutes, then cooled to about 160° F. and maintained thereat until a 70° F. viscosity of about 6,000 MacMichael #26d units is attained. The second caustic addition is made and the mixture is cooked until a new 70° viscosity of about 1,200 MacMichael #26d units is attained. Finally, the third caustic addition is made and the mixture is quickly cooled to about 50° F. The final Table A Dry shear strengths and wood failure of the plywood panels prepared in Example IV:

|  | Breaking load (p.s.i.) and percent wood failure using the | | | |
|---|---|---|---|---|
|  | Adh. of Ex. II | | Adh. of Ex. III | |
| Degree of white pocket rot infection. | Moderate | Severe | Moderate | Severe. |
| 5 minute assembly time | 126 p.s.i. / 61% | 60 p.s.i. / 39% | 93 p.s.i. / 20% | 75 p.s.i. / 5%. |
| 15 minute assembly time | 120 p.s.i. / 81% | 70 p.s.i. / 52% | 175 p.s.i. / 50% | 78 p.s.i. / 20%. |
| 25 minute assembly time | 94 p.s.i. / 70% | 67 p.s.i. / 49% | 80 p.s.i. / 33% | 130 p.s.i. / 28%. |

The cyclic test for delamination consists of alternately water-soaking and air-drying two 6″ x 6″ sections cut from each plywood panel until delamination occurs. For the purposes of this test, delamination consists of a separation of adjacent plies for 2 inches of continuous glue-line extending to a depth of ¼ inch. Each cycle consists of a 4-hour soak in water at room temperature followed by air drying at room temperature for 20 hours.

Table B

Cyclic test for delamination of the plywood panels prepared in Example IV: The number of cycles to delamination is reported for each of the two sections cut from each plywood panel.

|  | No. of soak-dry cycles to delamination using the | | | |
|---|---|---|---|---|
|  | Adh. of Ex. II | | Adh. of Ex. III | |
| Degree of white pocket rot infection | Moderate | Severe | Moderate | Severe |
| 5 minute assembly time | 8-8 | 3-3 | 1-1 | 1-1 |
| 15 minute assembly time | 12-12 | 8-12 | 4-5 | 1-4 |
| 25 minute assembly time | 17-17 | 8-12 | 1-3 | 1-4 |

The results summarized in Tables A and B demonstrate, mixture is adjusted to a working 70° F. viscosity of about 50 MacMichael #26d units by bodying at 160° F., if necessary. The resin obtained has a 180° F. gel time of about 4200 seconds.

EXAMPLE IV

Preparation of an epoxide-modified aqueous alkaline phenolic adhesive composition which differs from the adhesive composition of Example V only in that it additionally contains about 6% by weight, based upon the phenolic resin solids, of the ethylene glycol-epichlorohydrin reaction product of Example I:

| Ingredients | Parts | Approx. molar proportion |
|---|---|---|
| Phenol | 100 | 1.0 |
| 37% Formalin | 170 | 2.0 |
| Water | 100 | 5.2 |
| First 50% aqueous NaOH solution | 12 | 0.15 |
| Second 50% aqueous NaOH solution | 24 | 0.3 |
| Third 50% aqueous NaOH solution | 24 | 0.3 |
| Ethylene glycol-epichlorohydrin product of Ex. I | 10 |  |
|  | 440 |  |

The ingredients are combined as in Example V, adding the ethylene glycol-epichlorohydrin reaction product to the prepared phenolic resin at a temperature of about 60 to 80° F. and mixing thereat for about 5 minutes. The epoxide-modified resin has a 180° F. gel time of about 190 seconds.

Table C, following, shows the effect of varying proportions of the ethylene glycol-epichlorohydrin reaction product of Example I upon the gel time of the aqueous alkaline phenolic adhesive composition of Example V. The similar effect of a glycerol-epichlorohydrin reaction product containing an approximate molar ratio of about 1.0/2.4 is also shown. In each instance, the proportions of aliphatic polyhydric alcohol-epichlorohydrin reaction product employed are expressed as parts by weight per 100 parts of phenolic resin solids.

*Table C.—180° F. gel time of epoxy modified aqueous alkaline phenolic adhesive composition*

| Parts of modifier per 100 parts of phenolic solids | Phenolic adhesive of Ex. V. modified with— | |
|---|---|---|
| | Ethylene glycolepichlorohydrin product of Ex. I, seconds | Glycerol-epichlorohydrin reaction product, seconds |
| 0 | 4,200 | 4,200 |
| 1 | 2,200 | ------ |
| 1.5 | 1,000 | ------ |
| 2 | 215 | 190 |
| 4 | 135 | 100 |
| 6 | 121 | 100 |
| 10 | 108 | 95 |
| 25 | 90 | ------ |
| 35 | 80 | ------ |
| 50 | 95 | ------ |
| 75 | 170 | ------ |
| 100 | 510 | ------ |
| 125 | 1,490 | ------ |
| 135 | 2,020 | ------ |
| 150 | 2,660 | ------ |

As can be seen from Table C, as little as 1 part of the aliphatic polyhydric alcohol-halohydrin reaction product (herein called aliphatic halohydrin ether for brevity) per 100 parts of phenolic solids provides a significant increase in the reactivity, i.e., a decreased gel time, of aqueous alkaline phenolic adhesive compositions. There is little advantage to be gained in using more than 150 parts of aliphatic halohydrin ether per 100 parts of phenolic solids. The maximum increase in phenolic adhesive reactivity is obtained using from 25 to 50 parts of aliphatic halohydrin ether per 100 parts of phenolic solids; which range forms a preferred embodiment of this invention. However, another important feature of this invention is that it is possible to tailor aqueous alkaline phenolic adhesive compositions to the assembly time required for given applications by controlling the proportion of aliphatic halohydrin ether charged. The above proportions are equally pertinent to the protein and mixed phenolic and protein embodiments of this invention. In such systems the proportions are expressed as parts by weight per 100 parts of protein, or combined phenolic and protein solids, respectively.

The aliphatic halohydrin ethers employed in the practice of this invention are the Lewis acid catalyzed reaction products of liquid polyhydric aliphatic alcohols and mono- or di-halohydrins. Suitable polyhydric aliphatic alcohols include glycerol, ethylene glycol, propylene glycol, butandiol-1,4, pentandiol-1,4, octantriol-1,3,7, polyethyleneglycols such as tri-ethyleneglycols and polyethyleneglycols of up to about 1000 in moleclular weight, polypropyleneglycols, etc. Suitable halohydrins include epichlorohydrin, epibromohydrin, chlorohydrin, iodohydrin, bromohydrin, fluorohydrin, dichlorohydrin, dibromohydrin, etc. Mixtures of such polyhydric aliphatic alcohols and halohydrins may also be used.

These aliphatic halohydrin ethers may be prepared by heating substantially equivalent proportions of the liquid polyhydric aliphatic alcohol and the halohydrin at from 75 to 140° C. in the presence of a catalytic quantity of a Lewis acid. Substantially anhydrous components should be used. Suitable Lewis acid catalysts include boron trifluoride, stannous chloride, aluminum chloride, ferric chloride, antimony pentafluoride, etc. As indicated above, it is preferred to employ 1 molar proportion of the halohydrin for every molar equivalent proportion of hydroxyl groups of the liquid polyhydric aliphatic alcohol. However, more broadly, from about 0.65 to 1.1 molar proportions of the halohydrin may be used per molar equivalent proportion of said hydroxyl groups.

The aqueous alkaline phenolic adhesive compositions employed in one embodiment of this invention comprise, as their main active component, alkaline condensed phenolic resins prepared by condensing 1 molar proportion of a phenol with from 1.0 to 3.5 molar proportions of formaldehyde and from 0.1 to 2.5 mols of an alkali metal hydroxide. The condensation may be carried out in a single step but preferably is carried out in a plurality of steps accompanied by incremental addition of the alkali metal hydroxide. Such resins and the methods by which they may be prepared are more fully described in U.S. 2,360,376; 2,437,981; Re. 23,347 and in the applicant's copending application S.N. 35,442, filed June 13, 1960, now U.S. Patent No. 3,029,940. Conventional additives such as fillers, soda ash, sodium hydroxide, defoamers, etc., may also be present in these adhesive compositions which generally contain from about 12 to 50% by weight of phenolic solids depending upon the intended application.

Phenol may be obtained, and used in preparing the phenolic resin, in substantially pure form. However, commercially available phenol fractions having a distillation range of from about 180 to 220° C. and containing less than about 15% of orthocresol or xylenol, or mixtures thereof, may also be employed. The formaldehyde employed may be substantially pure or a commercially available aqueous solution thereof. For practical reasons, formalin, a 37% aqueous formaldehyde, is usually employed. The alkali metal hydroxide employed may be lithium hydroxide, sodium hydroxide, potassium hydroxide, rubidium hydroxide, cesium hydroxide, or some mixture thereof. Generally they are employed in aqueous solution.

The aqueous alkaline protein adhesive compositions employed in the second embodiment of this invention comprise as their main active component an animal or vegetable protein. Suitable animal proteins include, for example, casein, blood having a water solubility of from 0 to 100%, fish meal, meat scrap, egg albumin, bone or hide gelatin, etc. Suitable vegetable proteins include, for example, seed meal proteins such as cottonseed, peanut, linseed, sunflower seed, safflower seed, castor bean, rapeseed, etc., proteins; leguminous proteins such as soybean, navy bean, field pea, etc., proteins; corn zein; wheat gluten; etc. Mixtures of such proteins may also be employed. Although extracted and purified protein may be employed, cost considerations usually dictate the use of the commercially available forms thereof, such as flours, etc.

These protein adhesive compositions should have a pH of from about 10.5 to 14 derived from the presence of a water soluble alkaline agent such as, for example, an alkali metal hydroxide, e.g., sodium hydroxide, lithium hydroxide, potassium hydroxide, rubidium hydroxide or cesium hydroxide; ammonium hydroxide; an alkaline earth metal hydroxide, e.g., calcium hydroxide, magnesium hydroxide, strontium hydroxide, barium hydroxide, etc.; an alkali metal salt of a weak acid, e.g., sodium carbonate, potassium carbonate, sodium bicarbonate, potassium molybdate, sodium silicate, sodium fluoride, potassium sulfite, sodium phosphate, lithium phosphate, etc.; an alkaline earth metal salt of a weak acid, e.g., calcium phosphate, etc.; borax and similar salts of a strong base and a weak acid. These water soluble alkaline agents also disperse or solubilize the proteinaceous material. Conventional additives and modifiers may also be present, e.g., fillers, carbon disulfide, etc.

These adhesive compositions generally contain from about 10 to 35% by weight of proteinaceous solids depending upon the intended application.

In a third embodiment of this invention, the aqueous alkaline adhesive compositions employed may comprise mixtures of the above-described phenolic resins and proteins in any proportions.

The novel epoxide-modified aqueous alkaline phenolic and/or protein adhesive composition of this invention may be further modified with extenders, i.e., amylaceous materials, fillers, hardening agents, antifoam agents, buffer salts, dyes and the like to provide special adhesive compositions adapted to particular applications. These are conventional modifiers well-known to those skilled in the art.

The aliphatic halohydrin ether component may be charged into the aqueous alkaline phenolic and/or protein adhesive composition either before or after the inclusion therein of the conventional additives, if such are used. The resulting adhesive systems are stable for reasonable storage periods when maintained at temperatures below about 100° F. At higher temperatures premature setting of the adhesive system may be induced. However, in actual practice the aliphatic halohydrin ether component will usually be combined with the aqueous alkaline adhesive composition just prior to use.

The epoxide-modified aqueous alkaline phenolic adhesive compositions so obtained are especially useful, for example, as intermediate or hot press adhesives for use in interior or exterior plywood, lumber laminates, etc. An especially interesting application is their use as panel and lumber patching compounds, especially when combined in admixture with a filler and a small proportion of foamable plastic, e.g., polystyrene, beads. The corresponding protein adhesive compositions are especially useful, for example, as hot or cold press adhesives for use in interior plywood, lumber laminates, paper overlay glues, etc. Mixed phenolic and protein adhesive compositions also have many applications dependent, in part, upon the relative proportions of the phenolic and protein solids.

It is obvious that many variations may be made in the products and processes set forth above without departing from the spirit and scope of this invention.

What is claimed is:

1. A process for preparing an epoxide-modified aqueous alkaline adhesive composition which comprises combining an aliphatic halohydrin ether with an aqueous alkaline adhesive composition selected from the group consisting of aqueous alkaline phenolic adhesive compositions, aqueous alkaline protein adhesive compositions, and mixtures thereof, in proportions of from 1 to 150 parts by weight of the aliphatic halohydrin ether for every 100 parts by weight of phenolic and proteinaceous solids in the aqueous alkaline adhesive composition, and subsequently maintaining the mixture at a temperature of from about 50 to 100° F. for at least 10 minutes; said aliphatic halohydrin ether comprising the Lewis acid catalyzed reaction product of a liquid polyhydric aliphatic alcohol and a halohydrin selected from the group consisting of monohalohydrins, dihalohydrins, epihalohydrins, and mixtures thereof, in proportions of from 0.65 to 1.1 mols of the halohydrin for every molar hydroxyl equivalent of the liquid polyhydric aliphatic alcohol; said aqueous alkaline phenolic adhesive composition containing from 12 to 50% phenolic solids by weight which comprise the reaction product of (a) a phenol having a distillation range of from about 180 to 220° C. and containing less than about 15% of at least one phenol selected from the group consisting of orthocresol, xylenol, and mixtures thereof, (b) formaldehyde and (c) an alkali metal hydroxide in proportions of from 1.0 to 3.5 mols of formaldehyde and from 0.1 to 2.5 mols of alkali metal hydroxide for every one mol of the phenol, the alkali metal hydroxide initially being at least partially present; said aqueous alkaline protein adhesive composition having a pH of from about 10.5 to 14 derived from the dissociation of a water-soluble alkali metal compound and containing from 10 to 35% by weight of proteinaceous solids selected from the group consisting of animal and vegetable proteins and mixtures thereof.

2. A process as in claim 1 wherein the aqueous alkaline adhesive composition is an aqueous alkaline phenolic adhesive composition.

3. A process for preparing an epoxide-modified aqueous alkaline adhesive composition which comprises combining an aliphatic halohydrin ether with an aqueous alkaline phenolic adhesive composition in the proportion of from 1 to 150 parts by weight of the aliphatic halohydrin ether for every 100 parts by weight of phenolic solids in the aqueous alkaline phenolic adhesive composition, and subsequently maintaining the mixture at a temperature of from about 50 to 100° F. for at least 10 minutes; said aliphatic halohydrin ether comprising the Lewis acid catalyzed reaction product of a liquid polyhydric aliphatic alcohol and a halohydrin selected from the group consisting of monohalohydrins, dihalohydrins, epihalohydrins, and mixtures thereof, in proportions of from 0.65 to 1.1 mols of the halohydrin for every molar hydroxyl equivalent of the liquid polyhydric aliphatic alcohol; said aqueous alkaline phenolic adhesive composition having been prepared by (a) initially contacting 1 molar proportion of phenol with about 2 molar proportions of formaldehyde and about 0.15 molar proportion of sodium hydroxide at reflux for about 35 to 40 minutes, (b) adjusting the mixture to a temperature of about 160° F. and maintaining said temperature until a 70° F. viscosity of about 6,000 MacMichael #26d units has been attained, (c) adding about 0.3 molar proportion of sodium hydroxide, (d) maintaining the mixture at a temperature of about 160° F. until a 70° F. viscosity of about 1,200 MacMichael #26d units has been attained, (e) adding about 0.3 molar proportion of sodium hydroxide, and (f) rapidly cooling the mixture to about room temperature.

4. A process as in claim 3 wherein the aliphatic halohydrin ether is the Lewis acid catalyzed reaction product of 1 molar proportion of ethylene glycol with substantially 2 molar proportions of epichlorohydrin.

5. A process as in claim 4 wherein the proportion of the aliphatic halohydrin ether to phenolic solids is from 25 to 50 parts by weight per 100 parts.

6. A process as in claim 1 wherein the aqueous alkaline adhesive composition is an aqueous alkaline protein adhesive composition.

7. A process as in claim 6 wherein the protein is soybean protein.

8. A process as in claim 7 wherein the aliphatic halohydrin ether is the Lewis acid catalyzed reaction product of 1 molar proportion of ethylene glycol with substantially 2 molar proportions of epichlorohydrin.

9. An aqueous alkaline adhesive intermediate composition which comprises from 1 to 150 parts by weight of an aliphatic halohydrin ether and 100 parts by weight of an aqueous alkaline adhesive composition selected from the group consisting of aqueous alkaline phenolic adhesive compositions, aqueous alkaline protein adhesive compositions, and mixtures thereof; said aliphatic halohydrin ether comprising the Lewis acid catalyzed reaction product of a liquid polyhydric aliphatic alcohol and a halohydrin selected from the group consisting of monohalohydrins, dihalohydrins, epihalodrins, and mixtures thereof, in proportions of from 0.65 to 1.1 mols of the halohydrin for every molar hydroxyl equivalent of the liquid polyhydric aliphatic alcohol; said aqueous alkaline phenolic adhesive composition containing from 12 to 50% phenolic solids by weight which comprise the reaction product of (a) a phenol having a distillation range of from about 180 to 220° C. and containing less than about 15% of at least one phenol selected from the group consisting of orthocresol, xylenol, and mixtures thereof, (b) formaldehyde and (c) an alkali metal hydroxide in proportions of from 1.0 to 3.5 mols of formaldehyde and from 0.1 to 2.5 mols of alkali metal hydroxide for every one mol of the phenol, the alkali metal hydroxide initially being at least partially present; said aqueous alkaline protein adhesive compositions having a pH of from about 10.5 to 14 derived from the dissociation of a water-soluble alkali metal compound and containing from 10 to 35% by weight of proteinaceous solids selected from the group consisting of animal and vegetable proteins and mixtures thereof.

10. A unitized body comprising cellulosic material bound with an epoxide-modified aqueous alkaline adhesive composition prepared by a process which comprises combining an aliphatic halohydrin ether with an aqueous alkaline adhesive composition selected from the group consisting of aqueous alkaline phenolic adhesive compositions, aqueous alkaline protein adhesive compositions, and mixtures thereof, in proportions of from 1 to 150 parts by weight of the aliphatic halohydrin ether for every 100 parts by weight of phenolic and proteinaceous solids in the aqueous alkaline adhesive composition, and subsequently maintaining the mixture at a temperature of from about 50 to 100° F. for at least 10 minutes; said aliphatic halohydrin ether comprising the Lewis acid catalyzed reaction product of a liquid polyhydric aliphatic alcohol and a halohydrin selected from the group consisting of monohalohydrins, dihalohydrins, epihalohydrins, and mixtures thereof, in proportions of from 0.65 to 1.1 mols of the halohydrin for every molar hydroxyl equivalent of the liquid polyhydric aliphatic alcohol; said aqueous alkaline phenolic adhesive composition containing from 12 to 50% phenolic solids by weight which comprise the reaction product of (a) a phenol having a distillation range of from about 180 to 220° C. and containing less than about 15% of at least one phenol selected from the group consisting of orthocresol, xylenol, and mixtures thereof, (b) formaldehyde and (c) an alkali metal hydroxide in proportions of from 1.0 to 3.5 mols of formaldehyde and from 0.1 to 2.5 mols of alkali metal hydroxide for every one mol of the phenol, the alkali metal hydroxide initially being at least partially present; said aqueous alkaline protein adhesive composition having a pH of from about 10.5 to 14 derived from the dissociation of a water-soluble alkali metal compound and containing from 10 to 35% by weight of proteinaceous solids selected from the group consisting of animal and vegetable proteins and mixtures thereof.

References Cited by the Examiner
UNITED STATES PATENTS 2,599,799   6/52   Wittcoff _____ 260—2
2,892,809   6/59   St. Clair _____ 260—58

FOREIGN PATENTS 221,236   6/58   Australia.

OTHER REFERENCES

Ellis, Synthetic Resins and Their Plastics, 1923, The Chemical Catalog Company, Inc., N.Y., pages 125–127.

MURRAY TILLMAN, *Primary Examiner.*

A. D. SULLIVAN, MILTON STERMAN, LEON J. BERCOVITZ, WILLIAM H. SHORT, *Examiners.*